United States Patent [19]
Appleton

[11] 3,951,368
[45] Apr. 20, 1976

[54] ELECTRICAL CONDUIT CLAMP-BACK

[76] Inventor: Arthur I. Appleton, 1 Bridlewood Road, Northbrook, Ill. 60062

[22] Filed: Sept. 11, 1972

[21] Appl. No.: 288,131

[52] U.S. Cl. .............................. 248/74 R; 248/300
[51] Int. Cl.² .................................................. F16L 3/04
[58] Field of Search .......... 248/74 R, 71, 73, 361 B, 248/231, 65, 68 R, 248, 221, 67.5, 300, 69, 205 R; 24/73 SA; 174/157, 40 CC

[56] References Cited
UNITED STATES PATENTS

| 900,545 | 10/1908 | Humiston | 248/221 X |
| 1,113,781 | 10/1914 | Griffin | 248/231 X |
| 1,366,321 | 1/1921 | Kahn | 248/74 R |
| 2,361,732 | 10/1944 | Banneyer | 248/68 R |
| 2,582,384 | 1/1952 | Knollman | 248/74 R X |
| 2,886,270 | 5/1959 | Wendela | 24/73 SA X |
| 3,211,381 | 10/1965 | Rasmussen | 248/231 X |
| 3,232,569 | 2/1966 | Deardorf | 248/74 R |
| 3,515,363 | 6/1970 | Fisher | 248/71 |
| 3,559,933 | 2/1971 | Castellani | 248/74 R |
| 3,604,676 | 9/1971 | Weber | 248/68 R |

FOREIGN PATENTS OR APPLICATIONS

| 332,550 | 7/1930 | United Kingdom | 248/71 |
| 898,224 | 6/1962 | United Kingdom | 174/40 CC |
| 771,610 | 4/1957 | United Kingdom | 174/155 |
| 335,221 | 9/1930 | United Kingdom | 174/157 |
| 560,740 | 4/1944 | United Kingdom | 174/157 |

Primary Examiner—Roy D. Frazier
Assistant Examiner—Rodney H. Bonck
Attorney, Agent, or Firm—Darbo, Robertson & Vandenburgh

[57] ABSTRACT

A sheet metal base has three integral legs extending in one direction therefrom. Two of the legs are at sides adjacent one end of the base while the third leg is at the other end of the base. Projecting in the other direction from the base and adjacent said other end are pairs of ears at each side of the base. Each of these pairs of ears define a conduit receiving saddle. In a modified embodiment, the side legs are split to define a saddle for a conduit of another size whereby the clampback may be used one side up for one size of conduit and another side up for another size of conduit.

1 Claim, 6 Drawing Figures

U.S. Patent April 20, 1976 3,951,368
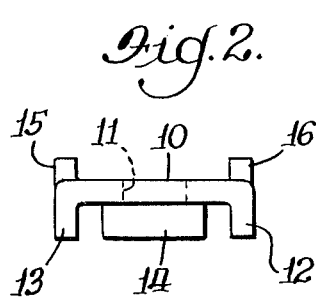
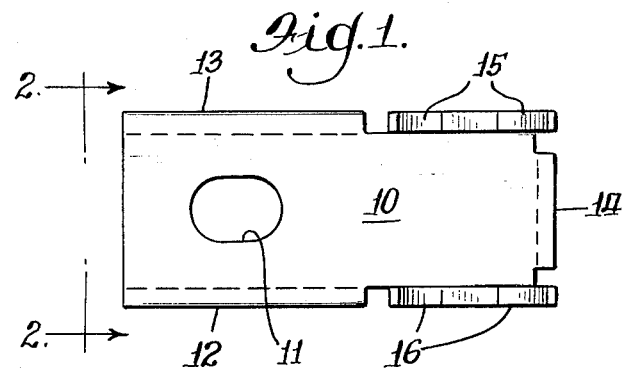
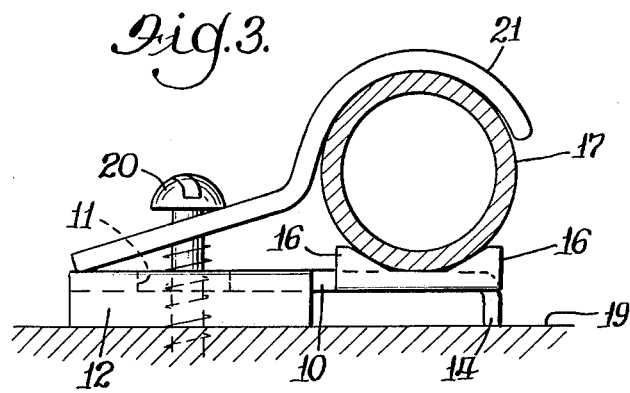
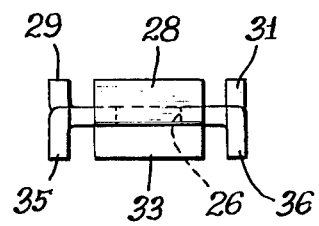
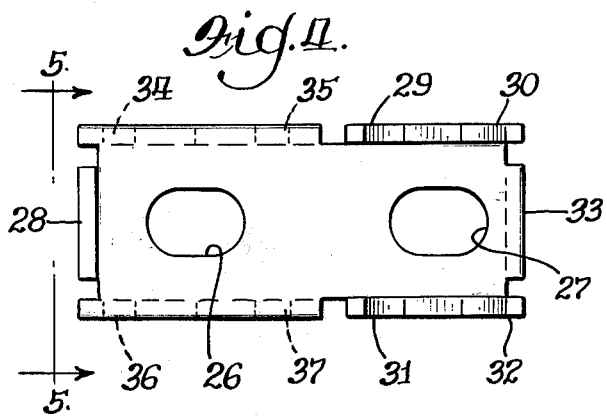
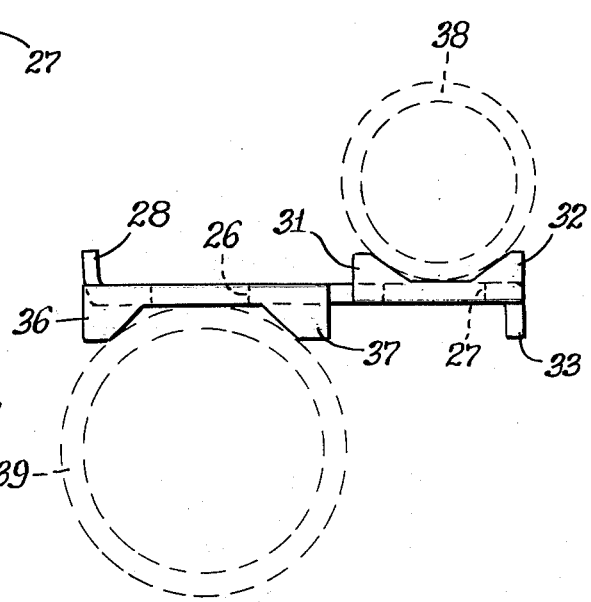

ELECTRICAL CONDUIT CLAMP-BACK

SUMMARY OF THE INVENTION

The present invention relates to a simple, inexpensive clamp-back for use in the mounting of electrical conduit.

DESCRIPTION OF THE DRAWINGS

FIG. 1 is a plan view of an embodiment of the invention;

FIG. 2 is an end view as seen at line 2—2 of FIG. 1;

FIG. 3 is an elevational view showing the use of the clamp-back in the mounting of electrical conduit;

FIG. 4 is a plan view of an alternate form of clamp-back;

FIG. 5 is an end view as seen at line 5—5 of FIG. 4; and

FIG. 6 is an elevational view of the embodiment of FIGS. 4–5, showing, in dotted lines, the manner in which different sizes of conduit are received.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

In the embodiment of FIGS. 1–3 there is a base 10 having an opening 11 therein. Adjacent the same end of the base as the opening 11 are a pair of depending feet 12 and 13. These have a length approximately one-half the length of the base. At the other end of the base is a third foot 14 depending from the base. At the same end of the base as the foot 14 are a pair of ears 15 and a pair of ears 16, each pair being at a respective side of the base. Each pair of ears forms a saddle to receive a conduit 17. For example, if the clamp-back were for use with ½ inch rigid conduit or ¾ inch thin-wall conduit the adjacent faces of a pair of ears would slope upwardly at a 30° angle and they would be spaced ¼ inch apart. For ¾ inch rigid or ½ inch thin-wall conduit, the adjacent faces of a pair of ears would slope upwardly at a 45° angle and would be spaced 17/32 of an inch apart at their closest point. In use, the clamp-back is placed against a wall 19 or other supporting surface, the conduit is placed in the saddles and a screw 20 extends through a clamp 21 and opening 11 to engage wall 19 to hold the assembly in place.

The clamp-backs are stamped from sheet metal. Sheet steel of about 0.090 thickness will be suitable for this purpose. In the stamping operation, the required configuration is cut from the metal and the various projections (feet and ears) are bent into the desired configuration. This makes for a comparatively inexpensive, yet adequately strong structure. One important feature is the use of three spaced feet 12–14. This provides stability on somewhat uneven surfaces.

The alternative embodiment illustrated in FIGS. 4–6 provides a single clamp-back which is usable for different sizes of conduit. It has a base 25 with two openings 26 and 27 therein. Extending in one direction from the base are five projections 28, 29, 30, 31 and 32. Extending in the other direction from the base are five projections 33–37. Projections 29–30 and 31–32 form pairs of ears which, when in the direction away from the wall 19, define saddles to receive a relatively small conduit 38. When in the direction toward the wall, they form feet to support the clamp-back against a surface along with projection 28 also serving as a foot. Pairs of ears 34–35 and 36–37 serve, when extending outwardly, as ears to define saddles for a larger conduit 39. When extending toward the wall, they serve as feet along with projection 33.

Obviously, the embodiment of FIGS. 4–6, will reduce the amount of supplies that a dealer or workman must have on hand. This simplifying of inventory is a money-saving matter. With only a single unit, the requirements for the mounting of several sizes of conduit can be satisfied.

I claim:

1. In the combination of a conduit clamp and a clamp-back employed to mount electrical conduit, the improvement wherein said clamp-back comprises:
 a stamped sheet metal member with a planar base of elongated form having two ends and two sides and an opening therethrough adjacent one of said ends, two depending side feet extending downwardly from opposite sides respectively of said base and adjacent said one end thereof, and a third depending foot extending downwardly from the other end of the base, said three feet having flat bottoms positioned approximately in a common plane and defining open spaces therebetween, two pairs of upstanding ears with the pairs being at opposite sides respectively of said base and extending upwardly from said base adjacent said other end thereof, each pair of ears defining a saddle for said conduit, said side feet being integral with said sides of said base adjacent said one end and said third foot being integral with said end of said base at said other end and said ears being integral with said sides of said base adjacent said other end and all having originally been in the same plane as the base when in sheet metal form but having been bent out of said plane to define said clamp-back, two additional depending feet at opposite sides respectively of said base so that there are a pair of said feet at each of said sides and adjacent said first pair of feet, said pairs of feet being spaced apart to form a second saddle for another conduit of a size different than the size for which said ears are adapted to receive, an upstanding projection extending, from said one end of the base, in the same general direction as that in which said ears extend and having an end extending the same height above said base as said ears, whereby said clamp-back may be used with one side outwardly for one size conduit and the other side outwardly for another size of conduit.

* * * * *